US009292271B2

(12) United States Patent
Ross

(10) Patent No.: US 9,292,271 B2
(45) Date of Patent: Mar. 22, 2016

(54) APPARATUS AND METHOD FOR MANAGING SOFTWARE TRANSLATION

(71) Applicant: Medidata Solutions, Inc., New York, NY (US)

(72) Inventor: Connor Ross, Astoria, NY (US)

(73) Assignee: Medidata Solutions, Inc., New York, NY (US)

( * ) Notice: Subject to any disclaimer, the term of this patent is extended or adjusted under 35 U.S.C. 154(b) by 246 days.

(21) Appl. No.: 13/902,640

(22) Filed: May 24, 2013

(65) Prior Publication Data
US 2014/0351798 A1    Nov. 27, 2014

(51) Int. Cl.
G06F 9/45       (2006.01)
G06F 9/44       (2006.01)

(52) U.S. Cl.
CPC ............... G06F 8/51 (2013.01); G06F 9/4448 (2013.01)

(58) Field of Classification Search
None
See application file for complete search history.

(56) References Cited

U.S. PATENT DOCUMENTS

| 5,903,859 | A  | * | 5/1999  | Stone et al. .................. 704/8 |
| 6,957,425 | B1 | * | 10/2005 | Nadon et al. ................. 717/175 |
| 7,103,875 | B1 | * | 9/2006  | Kaneko et al. ............... 717/125 |
| 7,536,294 | B1 | * | 5/2009  | Stanz et al. ................... 704/3 |
| 8,655,645 | B1 | * | 2/2014  | Morrissey ..................... 704/8 |
| 2001/0029455 | A1 |   | 10/2001 | Chin et al. |
| 2002/0002452 | A1 |   | 1/2002  | Christy et al. |
| 2002/0107684 | A1 | * | 8/2002  | Gao .................................. 704/4 |
| 2002/0162090 | A1 | * | 10/2002 | Parnell et al. ................. 717/120 |
| 2003/0115552 | A1 | * | 6/2003  | Jahnke et al. ................. 715/536 |
| 2003/0200535 | A1 | * | 10/2003 | McNamara ................... 717/137 |
| 2006/0156278 | A1 | * | 7/2006  | Reager ........................... 717/104 |
| 2006/0271920 | A1 |   | 11/2006 | Abouelsaadat |
| 2009/0138255 | A1 |   | 5/2009  | Sterling et al. |
| 2010/0057433 | A1 | * | 3/2010  | Jackson ........................... 704/3 |
| 2011/0264437 | A1 | * | 10/2011 | Wise et al. ...................... 704/3 |
| 2013/0226555 | A1 | * | 8/2013  | Lerum et al. .................... 704/2 |
| 2013/0227522 | A1 | * | 8/2013  | Lerum et al. ................... 717/120 |
| 2014/0096027 | A1 | * | 4/2014  | Ji et al. .......................... 715/744 |
| 2014/0157243 | A1 | * | 6/2014  | Vargas .......................... 717/137 |

FOREIGN PATENT DOCUMENTS

WO        2007/143706 A2    12/2007

OTHER PUBLICATIONS

The International Search Report and the Written Opinion of the International Searching Authority, PCT/US2014/039375, Oct. 30, 2014.

* cited by examiner

*Primary Examiner* — Insun Kang
(74) *Attorney, Agent, or Firm* — Steptoe & Johnson LLP; Robert Greenfeld

(57) ABSTRACT

An apparatus for use in developing a software application includes a translation manager for generating and maintaining a table comprising tokens, native language messages, and translated messages, a technical communicator for verifying that the native language messages comply with at least one of policies, grammar rules, spelling rules, and duplication rules, and a translator for translating the native language messages into the translated messages. A method for managing translation in the development of a software application is also described.

5 Claims, 5 Drawing Sheets

| TokenID | Token Name | Application |
|---|---|---|
| 41 | MONTH1 | Rave |
| 42 | MONTH2 | Rave |
| 43 | MONTH1 | Balance |
| 44 | MONTH2 | Balance |
| 45 | MONTH1 | Coder |
| 46 | MONTH2 | Coder |
| * | * | * |
| * | * | * |
| * | * | * |
| 60 | ADDNEWFIELD | Rave |
| 61 | ADDNEWFIELD | Balance |
| 62 | ADDNEWFIELD | Coder |

FIG. 4A

| TokenID | Language | Translation |
|---|---|---|
| 41 | Japanese | 1月 |
| 41 | English | January |
| 41 | French | Janvier |
| 42 | Japanese | 2月 |
| 42 | English | February |
| 42 | French | Fevrier |
| * | * | * |
| * | * | * |
| 60 | Japanese | 新規フィールド追加 |
| 60 | English | Add New Field |
| 60 | French | Ajouter un nouveau champ |
| * | * | * |
| * | * | * |
| 41 | Italian | Gennaio |
| 42 | Italian | Febbraio |

FIG. 4B

APPARATUS AND METHOD FOR MANAGING SOFTWARE TRANSLATION

BACKGROUND

With increasing globalization of products and the use of the Internet and World Wide Web, software applications are often written so that speakers of many languages can use them. But because developers of software applications are typically fluent in only a limited number of languages (frequently only one language), writing applications for diverse markets requires translation of the various aspects of the application, including the terms and phrases that appear on pages displayed to users. Indeed, each page displayed to a user may include a large number (e.g., over 100) of unique terms and phrases, each represented in an application's code by a corresponding "token," and typical applications may have a large number of (e.g., over fifty) displayable pages, multiplying the number of tokens that need to be translated to even greater numbers (e.g., over 1000). Thus, developers of such applications often must rely on translators or translation tools to perform translation tasks while they are writing the software underlying an application.

In a development environment, it is generally not practical to seek immediate translation of each token, so developers often accrue a group of tokens and then periodically submit the group for translation. This is burdensome because, for example, the developer must keep track of the tokens that have been submitted for translation, the tokens that still need to be submitted for translation, where each token should be placed within the application under development after it has been translated, and whether certain tokens have been superseded due to changes to the software during the pendency of the translation process.

Additionally, this process may be further complicated when more than one developer is working on a given software application. In such a situation, keeping track of the various tokens can be difficult, especially if there is duplication of tokens by more than one developer (e.g., if more than one developer uses the same token). Additionally, it is difficult to keep track of tokens across multiple applications, whether such applications are entirely distinct or share any common resources, such as databases, code libraries, etc.

BRIEF DESCRIPTION OF THE DRAWINGS

FIGS. 4A and 4B are examples of token tables that manage the use of tokens in a number of software applications according to an embodiment of the present invention.

Figure 1:
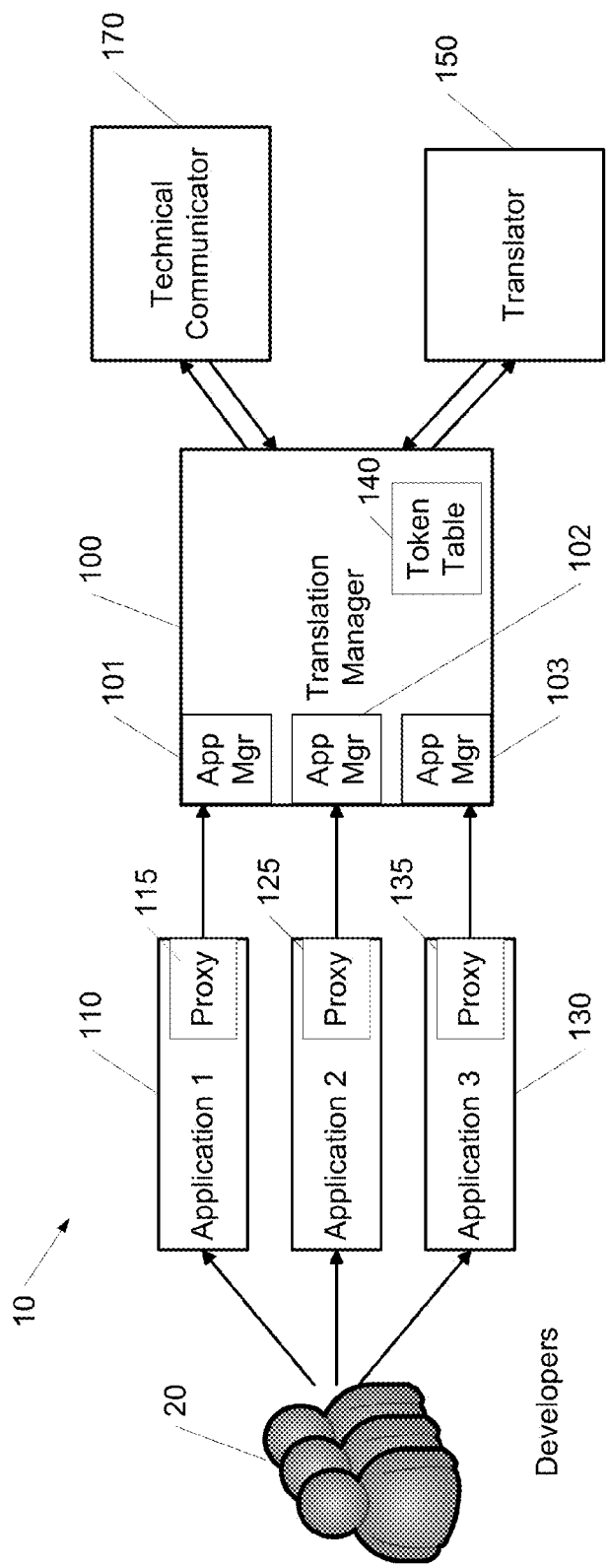
FIG. 1 is a block diagram of a system that includes a translation manager according to an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Embodiments of the present invention may be used with respect to developing software applications, but the invention is not intended to be limited to any particular software application or market. Additionally, any examples of particular software applications or markets used herein are included for illustration purposes and are not intended to be limiting.

In developing software applications, especially those that are web-based, the text requiring translation often comprises small phrases that can be retrieved by a single, unique token. Because proper translation is often not performed promptly or rapidly, phrases to be translated may be gathered over time and then submitted together for translation in order to minimize the overhead of creating a translation task using a translation tool. A translation tool is a third-party application that provides translation, whether using a computer (often called "machine translation") or human to translate. Because of the delay inherent in waiting for a sufficient number of phrases to accumulate or in waiting for translation of a group of phrases, the application under development may contain improper or incomplete translations. Moreover, once the translated phrases are received from the translation tool, the software developer must manually place the messages back into the application. It will be appreciated that the above steps invite error, waste developer resources, and are inefficient.

A translation manager has been developed which is capable of minimizing the problems associated with translation of messages during development of software applications. The translation manager may allow applications under development to retrieve all current translated text for one or more languages. For example, a developer may have previously kept all the translations in a text file in the format "token1=string" for all the tokens in the application for each supported language, where the "string" represents the displayable text for the text file's specific language. With the translation manager as described herein, developers may not be required to copy and paste new tokens and their corresponding displayable text into separate language tables or text files because the translation manager manages these tasks. This offers many advantages, including but not limited to saving developers countless hours of storing, updating, and maintaining numerous files when translations come back from translation tools, taking text and translation changes out of the application code, and using an external application (i.e., the translation manager) to store and manage displayable text.

The translation manager may allow technical communicators (TC) (a type of technical writer who may check the appropriateness of tokens and their corresponding displayable text phrases) and/or translators to complete assigned tasks on a practical schedule, rather than according to the developer's sometimes demanding or unrealistic schedule. Without the translation manager, translation tasks may be handed to a technical communicator and/or translator when a developer decides it is time for new tokens and their corresponding phrases to be translated. With the translation manager, a technical communicator and/or translator may be able to view in real time the new tokens and their corresponding phrases to be translated as well as phrases that may need to be retranslated, even as a developer adds them to a software application. Moreover, if a translator uses a translation tool such as XTM Cloud, the translation manager may manage the two-way communication of translation tasks using the tool's API (application programming interface). The translation manager may also ensure that technical communicators and/or translators avoid being overloaded near release time when an organization simultaneously releases a single or multiple applications; instead, the work may be spread throughout the lifecycle of an application under development and thereafter.

Figure 3:
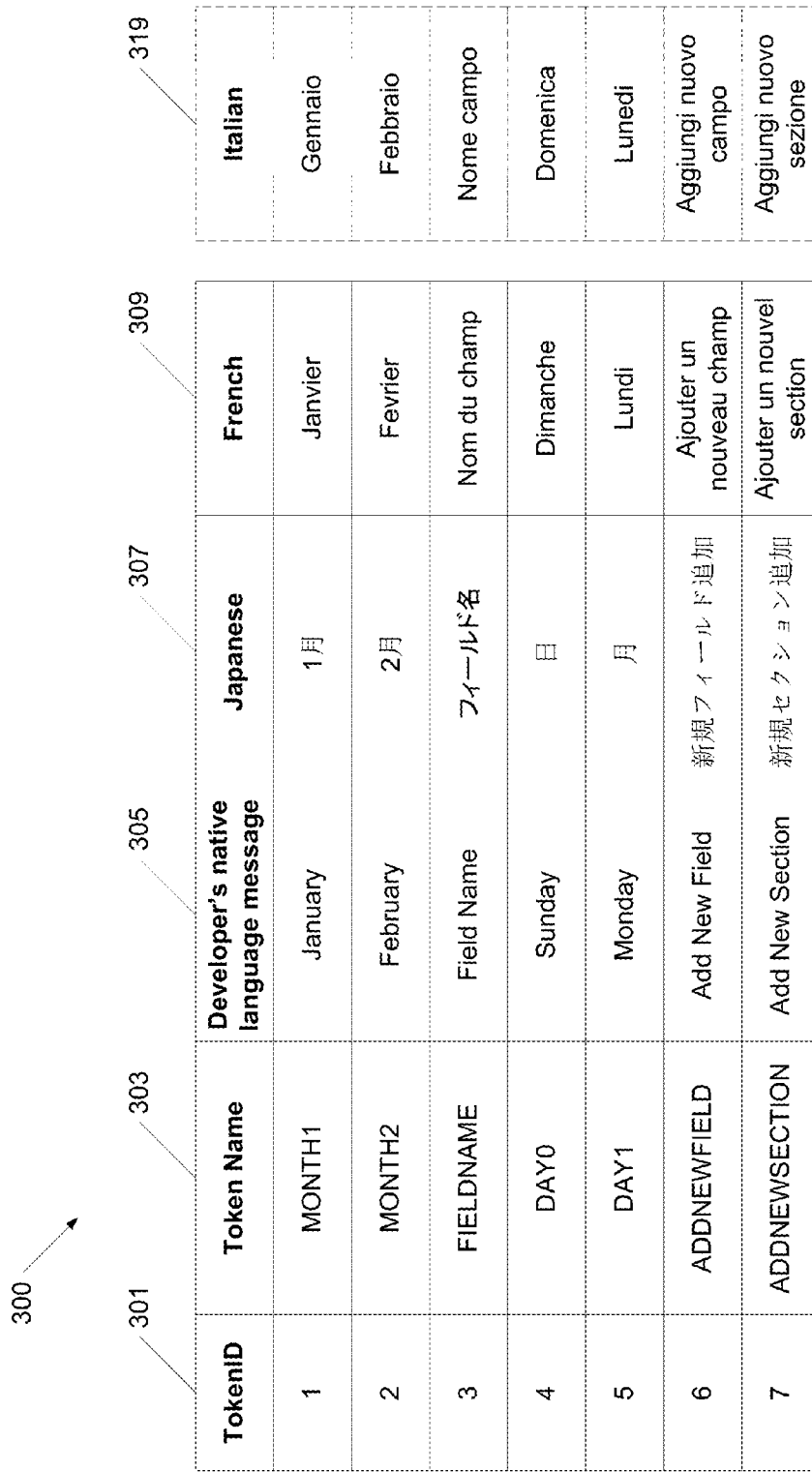
FIG. 3 is an example of a token table according to an embodiment of the present invention.

Reference is now made to FIG. 1, which is a block diagram of a system 10 that includes a translation manager 100 according to an embodiment of the present invention. Included in system 10 are one or more software developers 20, who may be developing (i.e., coding) one or more software applications 110, 120, 130, also called "client applications." Applications 110, 120, 130 may include, for example, standalone or web-based software programs that require translation of pages displayed to the user. Each application under development may be in communication with translation manager 100. Each application may contain a translation proxy 115, 125, 135. Translation manager 100 may also be in communication with translator 150 and/or technical communicator (TC) 170, and may contain one or more token tables 140, stored in and/or accessible through one or more databases (not pictured in FIG. 1). Token table 140 may store token names, their native language messages, and their translations. (Examples of token tables are shown in FIGS. 3, 4A, and 4B, described below.)

Translator 150 may be a human translator or an automated translation tool, including but not limited to XTM Cloud, Gengo, Google Translate, or any other automated translation tool. Translator 150 may provide an API through which translation manager 100 may request a translation and through which translator 150 may return the translated item. For translators with APIs, the translation manager 100 may register, or pre-configure, the translator's APIs. An application 110, 120, 130 may choose which translator it will use for translations, for example via a user interface (UI) within translation manager 100, or translation manager 100 may choose the translator 150 to be used.

Technical communicator 170 may be an automated or human service that may check the message to be translated for policy adherence, grammar, spelling, and duplication. Regarding policy adherence, companies that develop software applications (or their customers) may have certain policies about how language is displayed on the screen, for example, not to use the word "you" to refer to the user. There may be duplication if another token or native language message with the same or very similar text is already being used in the application, possibly by another developer.

An automated technical communicator 170 may use a database (not shown in FIG. 1) that may contain rules for duplication, policy adherence, grammar, and spelling. In more detail, in one embodiment of the present invention, executable instructions in technical communicator 170 may calculate whether the token or native language message is the same as or, with the application of fuzzy logic, is very similar to tokens or native language messages stored in token table 140. This may cause translation manager 100 to notify the developer that there is a duplicate native language message already stored in token table 140. Executable instructions in technical communicator 170 may also calculate updates or replacement words in accordance with rules for policy adherence, grammar, and spelling. This may cause translation manager 100 to update the native language message within token table 300, column 305, where column 303 matches the Token Name of the updated native language message.

Translation manager 100 may itself be, for example, a standalone, web-based, or cloud-based software program, or it may be a plug-in within another program. It may be software-application independent, i.e., independent of applications 110, 120, 130, and independent of translator 150 and technical communicator 170. In other embodiments, however, translation manager 100 may include software code that performs the tasks of translator 150 and technical communicator 170. Translation manager 100 may also include a component such as application manager 101, 102, 103 that interacts with applications 110, 120, 130, respectively, and/or translation proxies 115, 125, 135, respectively. Application managers 101, 102, 103 may manage some parts of the interactions between the client application and translation manager 100.

Figure 2:
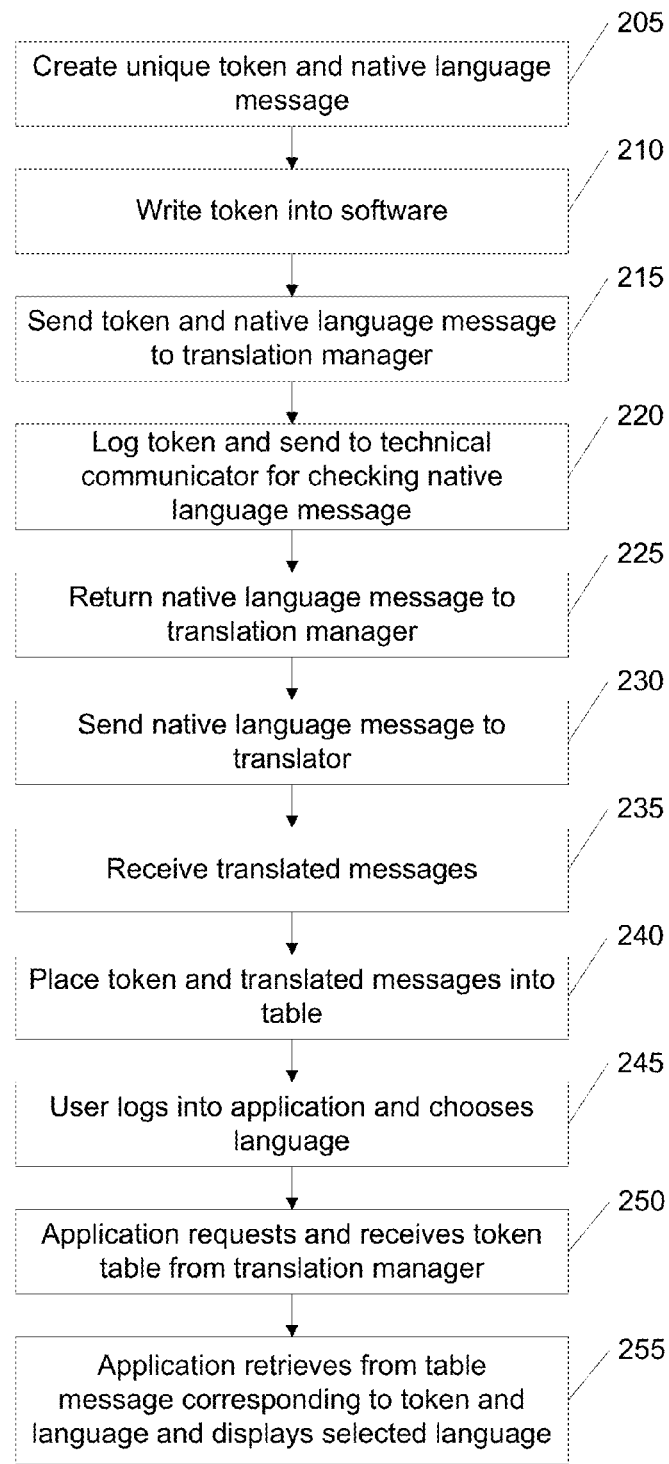
FIG. 2 is a flowchart illustrating how the system may develop, manage, and use tokens according to an embodiment of the present invention.

FIG. 2 is a flowchart illustrating how system 10 may develop, manage, and use tokens according to an embodiment of the present invention. While developing one or more software applications 110, 120, 130, a developer 20 may create a token in operation 205 along with the native language message that will be displayed in the native language version of the software application. Such a token may be in the form of a short, no-space, unique (within the client application) string that represents the message, or may be any other token or combination of tokens known to those skilled in the art. Turning to FIG. 3, which is an example of a token table 300, according to an embodiment of the present invention, seven tokens are shown in column 303. The native language messages that are represented by the tokens are shown in column 305 (in this example, English is the developer's native language).

Returning to FIG. 2, in operation 210, developer 20 may write the token into the software application and, in operation 215, may send the token and native language message to translation manager 100. In operation 220, translation manager 100 may log the token, for example by making an entry in token table 300 for the token. Then translation manager 100 may send the token and its native language message to technical communicator 170 to check the native language message for policy adherence, grammar, spelling, and duplication, as described above.

In operation 225, the technical communicator may return the native language message (corrected, if necessary) to translation manager 100. In operation 230, translation manager 100 may send the native language message to translator 150 for translation into various languages. In operation 235, translation manager 100 may receive the translated messages for the token back from translator 150 and, in operation 240, translation manager 100 may place the token and translated messages into token table 140. Besides the operations shown in FIG. 2, other operations or series of operations are contemplated to manage tokens. Moreover, the actual order of the operations in the flowchart is not intended to be limiting, and the operations may be performed in any practical order.

FIG. 3 is a token table 300 according to an embodiment of the present invention. Each software application 110, 120, 130 may typically have its own token table or section of a token table (so, in general, tokens are not used across applications). Token table 300 includes column 301, TokenID, column 303, Token Name, column 305, native language message for the Token Name, and columns 307, 309 for the messages translated into Japanese and French. Table 300 includes seven tokens, and the application is initially available in English, Japanese, and French.

Column 319 is a column similar to columns 307, 309 but includes messages translated into Italian. The dashed lines represent that the Italian translations were made at a later time than the Japanese and French translations. In other words, when translation manager 100 sent native language messages to translator 150, perhaps in operation 230, translation manager 100 requested translation only into Japanese and French, perhaps because the software developer had not yet determined that the application should be available in Italian also. Column 319 shows that it is relatively easy to add supported languages to the application, just by adding a column to token table 300, and this addition of supported languages does not need to involve any input from developer 20. Token table 300 is used as an example only and other forms of tables can be used to keep track of tokens, their messages, and their translations.

Once tokens and their messages reside in a table, they may then be used in an application. For example, in operation 245, a user of the application may log into the application, and the user may provide the application with a preferred language. In the examples used herein, the choices are English, Japanese, French, and Italian, but these are not intended to be limiting; indeed, any suitable language may be chosen. If the user chooses, for example, "Japanese," in operation 250, the application may call translation manager 100, which may provide token table 140 (or table 300) to the application. When the application displays (or renders) the specific page, in operation 255, the application may look for the token names in the underlying software code and then may look through token table 140 or 300 to find the corresponding message for the selected language. In the example of FIG. 3, if the token name in the underlying software code is MONTH2 and the preferred language is Japanese, the application will pull out TokenID 2 and will display "2月" in that position. It will be appreciated that the application may also look through token table 140 or 300 for TokenIDs or other unique identifiers as well as token names.

Tokens may be used in more than one application, in which case token tables may vary from that in FIG. 3. FIGS. 4A and 4B show examples of token tables that manage the use of tokens in a number of software applications according to an embodiment of the present invention. As mentioned above, token names are typically unique within an application, but may be reused in different applications. Column 405 in FIG. 4A shows the application to which each token name may be assigned. In this example, there are three applications, "Rave®," "Balance®," and "Coder®," all of which are software applications developed by Medidata Solutions, Inc., the assignee of the present application. Table 400 shows the association between TokenID in column 401, Token Name in column 403, and Application in column 405. Rows 402-412 show that the two token names, MONTH1 and MONTH2 are used in each of the three applications, and they are given different TokenIDs. Table 450 in FIG. 4B then shows the language into which the token is translated and the translated message. Thus, if as in the discussion above the token name in the underlying software code is MONTH2 and the preferred language is Japanese, the application "Rave" will pull out TokenID 42 in row 404 and match up TokenID 42 in row 458 in table 450 for Japanese, and will display "2月" in the MONTH2 position.

FIG. 4A shows one way of adding to the table tokens for multiple applications. Rows 444-448 in table 400 are related to Token Name ADDNEWFIELD for applications Rave, Balance, and Coder, respectively. In FIG. 4B, rows 474-478 may be added to account for new TokenID 60 in row 444.

FIG. 4B also shows one way of adding to the table tokens for additional languages. Table 450 includes rows 496, 498, which include two token IDs used for Rave (TokenIDs 41, 42, corresponding to MONTH1 and MONTH2 respectively), with their Italian message translations. As in FIG. 3, the dashed lines represent that the Italian translations were made at a later time than the Japanese and French translations, perhaps because the software developer determined that the application should be available in Italian also. Like the addition of column 319 in FIG. 3, rows 496, 498 show that it is relatively easy to add supported languages to the application, just by adding a row to token table 450 for each token ID, and, again, this addition of supported languages does not need to involve any input from developer 20. Previously, to add translations for a new language, the developer would have been required to rewrite code in the application. In some cases, it may be easier in a database environment to add rows, e.g., 496, 498, to the token table than to add columns, e.g., 319, so some developers may prefer the structure of table 450 to that of table 300.

Figure 5:
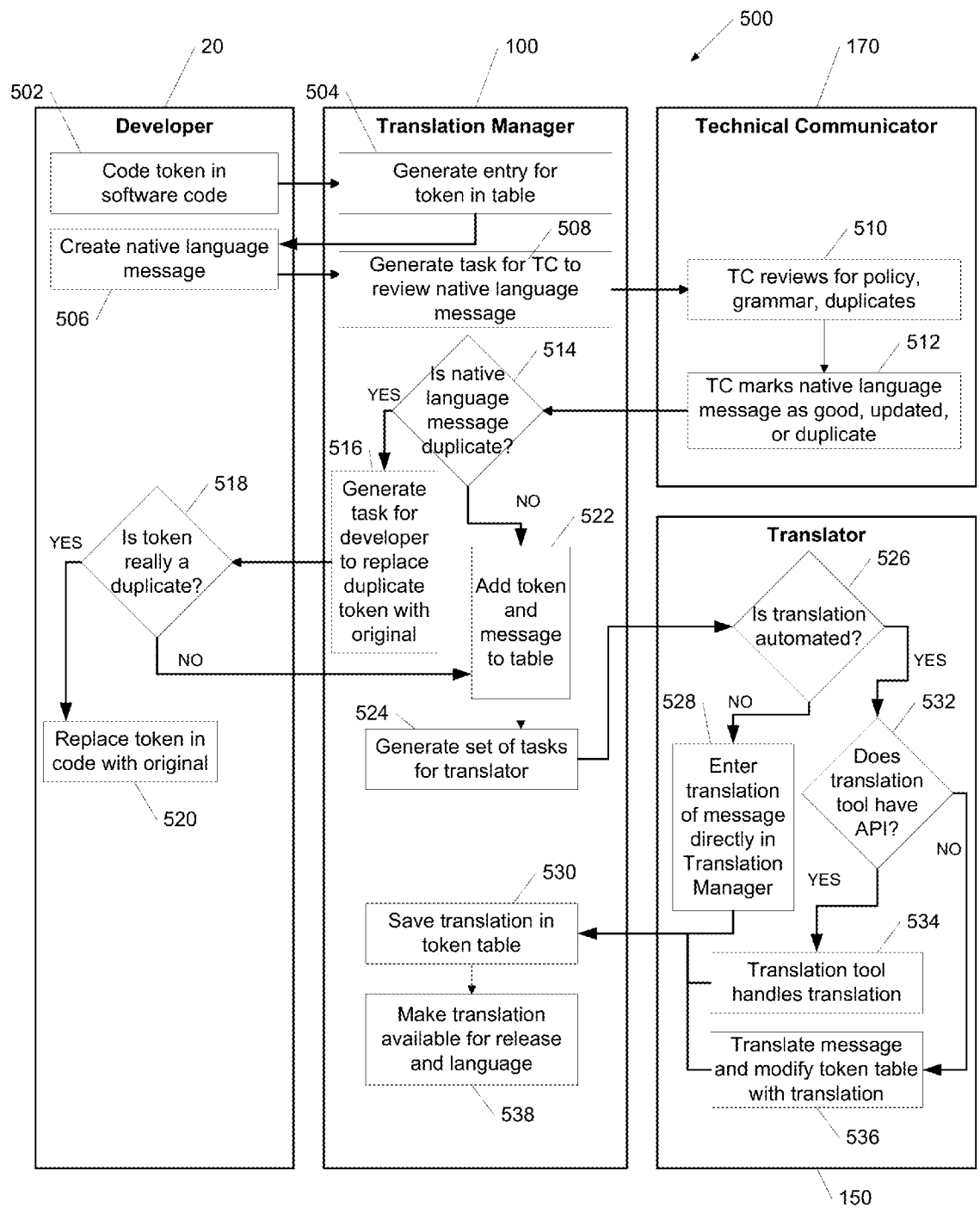
FIG. 5 is a flowchart illustrating how parts of the system interact according to an embodiment of the present invention.

Reference is now made to FIG. 5, which is another flowchart 500 illustrating how parts of the system interact according to an embodiment of the present invention. Shown are the four main blocks of system 10-developer 20, translation manager 100, technical communicator 170, and translator 150. Flowchart 500 shows generally how tokens and native language messages may be generated and managed by translation manager 100 and parceled out to technical communicator 170 to check the native language message and to translator 150 for translation into the various supported languages. In operation 502, developer 20 may code a token name in the software code. This may cause translation manager 100 in operation 504 to generate a table entry for that token (e.g., in token table 140 shown in FIG. 1), and then translation manager 100 may prompt developer 20 to create the native language message for the token in operation 506. A developer may also directly code a token name and native language message into the translation manager's token table 140, and later code the token name into the application. In operation 508, translation manager 100 may then generate a task for technical communicator 170 to review the native language message for policy adherence, grammar, and duplication, which it may do in operation 510. Technical communicator 170 may then mark the native language message as "good" or "updated," if the message was fine or if the technical communicator corrected it, or "duplicate," if the token and message were already in the token table. In operation 514, translation manager 100 may ask whether the native language message was a duplicate. If not, then in operation 522 translation manager 100 may add the token and the message to token table 140. If the native language message was a duplicate, in operation 516, translation manager 100 may generate a task for developer 20 to replace the duplicate token with the original token identified by the technical communicator. In operation 518, developer 20 may review the token and the supposed original token and ask whether the token is really a duplicate. If it is, in operation 520, developer 20 may replace the token in the code with the original token. If, however, the token is not really a duplicate, developer 20 may inform translation manager 100 so that it may add the token and the message to token table 140 in operation 522.

Once the token and native language message are set, translation manager 100 may prepare to send the native language message out for translation. In operation 524, translation manager 100 may generate a set of tasks for translator 150. The set of tasks may include one task for translation of the message into each supported language. As mentioned earlier, translator 150 may be a person or may be automated. If it is a person (i.e., not automated) as determined in operation 526, then in operation 528 the translator may translate the message and enter it directly in token table 140. In operation 530, translation manager 100 may then save the translation in token table 140. If translator 150 is automated, the translation may be performed via the translator's registered API. If the translation tool has a registered API, as determined in operation 532, the translation tool handles the translation in operation 534 and sends it to translation manager 100, which saves it in token table 140 in operation 530. If the translation tool does not have a registered API, the translation manager may provide a download of a translation task to be uploaded to the translation tool and, after the translation tool translates the message, the task may be uploaded back into the translation manager to token table 140 with the translation in operation 536, after which translation manager 100 saves the translation in operation 530. Once the translation is saved, translation manager 100 may make such translation available for the current release of the application and the supported language in operation 538.

Besides the operations shown in the flowcharts in FIGS. 2 and 5, other operations or series of operations may be contemplated to generate a token table 140 with translated messages. For example, prior to the operations shown in flowchart 500 there may be preliminary operations taken by the developer, technical communicator, and translator. In one non-limiting example, the developer may log into the translation manager and set the languages that the developer understands, so that translation manager 100 knows which languages the developer considers "native" and which ones the developer could translate messages into if necessary, bypassing the translator. The technical communicator may log into the translation manager so that he or she may receive tasks from the translation manager and return them to the translation manager. Similarly, the translator may also log into the translation manager so that he or she may enter the translation of a message directly into token table 140 (as discussed with respect to operation 528).

In addition, flowchart 500 shows how a single token is processed during development of a software application. As development progresses, in the case in which a token table may already exist, when the developer logs on, the translation manager may download to the developer the token table. Then, when the developer writes new software and tests it by attempting to run it, translation manager 100, through a translation proxy 115, 125, 135, in an application 110, 120, 130, respectively, or the developer may discover places in the code where tokens or translated messages do not yet exist. The translation manager may then prompt the developer to create new tokens to fill the voids.

In more detail, in one embodiment of the invention, a translation proxy 115, 125, or 135 may find tokens in an application 110, 120 or 130, respectively, that do not yet exist and do not contain corresponding native language messages in the translation manager's token table 140. The translation proxy may then generate notification(s) to translation manager 100 to set up one or more tasks for the developer to provide native language messages for the token table. Once the developer has provided native language messages for the new tokens, the translation manager may resume the workflow at 508 (sending tasks to technical communicator 170) or 524 (generating tasks for translator 150). In another embodiment of the invention, in which the developer may have already coded a token into the application and also provided the token and the corresponding native language message to token table 140, translation manager 100 may not require step 508. In yet another embodiment of the invention, in which the developer may have already provided the token and native language message to token table 140 but not coded the token into the application, the translation proxy may then generate a notification to translation manager 100 to set up a task for the developer to address tokens that exist in the translation table but which are not yet coded into the application. In general, a translation proxy 115, 125, 135 handles all communication between its corresponding application 110, 120, 130 and translation manager 100 such than when application 110, 120 or 130 is executed, the translation proxy requests the translation (including the native language message, if it does not already exist) for the coded token. Although shown as part of applications 110, 120, 130, the tasks performed by translation proxies 115, 125, 135 may be performed instead by software on the translation manager side, and may be represented as application managers 101, 102, 103, shown in FIG. 1. Alternatively, both translation proxies 115, 125, 135 and application managers 101, 102, 103 may exist and share the performance of these tasks.

The invention also contemplates that there are numerous environments in which applications operate. These environments may include, but are not limited to, development, in which the software is written and tested, validation, in which the software is tested in more real-world conditions, and production, when the application is used by the end-user. Different releases or versions, e.g., v. 1.0, v. 2.0, and v. 3.0, of a software application may operate in different environments, and each one may use the translation manager. For example, Version 1.0 may be in production, Version 2.0 may be in validation, and Version 3.0 may still be in development. In production, users generally do not have the ability to create tokens, but when a user logs in, the user should choose a language and token table 140 should be downloaded to the application so that the pages of the application can be viewed in the supported language. In contrast, in development, token table 140 may also be downloaded to the application, but developers have the ability to create and use tokens. In validation, the ability to create tokens may be limited so as not to jeopardize the validation process. Translation proxies 115, 125, 135 may function regardless of the programming environment, e.g., development, validation, or production.

Also, the actual order of the operations in the flowcharts is not intended to be limiting, and the operations may be performed in any practical order. For example, operations 502 and 506 are shown as distinct operations—coding a token and creating a native language message—but operation 205 combines similar operations into one. Also, some tasks assigned to the developer, technical communicator, and translator may be performed in serial or in parallel or in a different order from that depicted herein. One of the benefits of the invention is that the technical communicator and/or translator can perform their jobs on their schedules, and not based on the developer's schedule or how the developer decides to bundle his or her tokens.

The parts and blocks shown in FIGS. 1 and 5 are examples of parts that may comprise system 10 and translation manager 100, and do not limit the parts or modules that may be included in or connected to or associated with system 10 and translation manager 100. For example, as mentioned before, translator 150 may be a person or may be automated. If automated, it could become a part of translation manager 100 or at least controlled by translation manager 100, rather than be a third-party service. Similarly, the functions of technical communicator 170 may be automated, such as by the use of an automatic grammar checker, an automatic policy reviewer, and an automatic duplication checker. If automated, technical communicator 170 could also become a part of translation manager 100 or at least controlled by translation manager 100, rather than be a third-party service. Such automation of the translator and technical communicator may reduce bottlenecks that currently exist when humans are involved. In addition, token table 140 is shown in FIG. 1 as a single table, but it may comprise different sections for different applications as described above or could be made up of separate tables, e.g., 140a, 140b, 140c (not pictured), one for each application. Moreover, although shown within translation manager 100, token table 140 may not be contained within translation manager 100 but may be stored in a location accessible to translation manager 100.

The software applications used as examples in some of the embodiments are Medidata clinical data applications, but it is understood that the present invention may be used in any other field involving software development for users in more than one language.

Some of the benefits of the present invention are that developers may use the translation manager, which may be configured as a programming language-specific plug-in, to retrieve tokens upon application startup, and the translation manager can automatically generate new tokens when a developer adds a token to the development codebase. In a deployed environment workflow, the applications may go from development to validation to production where the codebase is a different version for each environment, but the translations can still be managed in each environment. Translations can be updated for the development environment, while users still use the version in production that is meant for production. The translation manager supports automatically moving translation versions between environments when the codebase version is updated in an environment. Embodiments of the invention offer centralized translation management whether an organization has one or a hundred applications, and translators and technical communicators can manage their tasks via one interface.

Additional benefits include allowing the client application to continue receiving translations regardless of the status of a specific translator 150, that is, even if any specific translator 150 stops working, shuts down, or goes out of business. Application 110, 120, 130 may then be able to switch its choice of translator or translation tool via the translation manager's UI, without changing the software code in software application 110, 120, 130. Embodiments of the present invention host the messages that are requested by an application. Without this invention, such messages were added to a file within the application after the translation team said the translations were complete. Embodiments of the present invention also allow tokens to be different across application environments, so it is able to update messages in newer releases to match new requirements. Finally, embodiments of the invention have the ability to auto-generate translation tasks when a token first shows up in a new release and do not have to wait until the developer releases the tokens.

The translation manager may reduce the lag time created by a developer who accrues tokens for translation. Now, as soon as a token is created and the developer puts in the message, the technical communicator can process it, and then the translator can begin working on it. In addition, before the invention, when the translated messages were returned from the translator, the developer would gather all tokens into batches and would put the batches of the tokens into token table 140. Now, the translated messages may be generated and inserted into token table 140 without the manual and error-prone developer work effort. In fact, once the developer sends the token and native language message to the translation manager, the developer generally does not see the token again, reducing a great deal of work effort.

Translation manager 100 may be implemented as a standalone program or may be implemented on a network, for example, over the Internet as a cloud-based service or hosted service, which may be accessed through a standard web service API.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A computer-implemented method for managing tasks associated with translation for a software application, comprising:

identifying, with a computer processor, a token name included in the software application but not included in a database for storage of token names accessible by the software application, wherein the identifying comprises comparing the token name to the database contents, wherein the token names are unique within the software application and are configured to be reused;

notifying, with the computer processor, a developer of the software application to provide a native language message corresponding to the identified token name;

receiving from the developer, with the computer processor, the native language message corresponding to the identified token name;

applying, with the computer processor, to the received native language message a set of rules stored on a computer-readable medium, to calculate whether the received native language message is not included in the database;

generating, with the computer processor, a record in the database corresponding to the identified token name and to the received native language message that was calculated as not being included in the database;

identifying, with the computer processor, the existence of a translation tool; and if the translation tool comprises an application programming interface (API), then:
　　transmitting, via the API, to the translation tool the unincluded native language message; and
　　receiving, via the API, a translated native language message;
otherwise:
　　receiving, with the computer processor, a translated native language message from a human translator; and
updating, with the computer processor, the database record with the translated native language message.

2. The method of claim 1, wherein applying the set of rules further comprises determining whether the received native language message adheres to grammar or spelling rules.

3. The method of claim 1, wherein applying the set of rules further comprises determining whether the received native language message adheres to policy rules.

4. A system for managing translations of a software application, the system comprising:
　　a processor;
　　a database component, stored in a non-transitory computer-readable medium and executed by the processor, operative to maintain records corresponding to token names, said records accessible to the software application; and
　　a management component, stored in the computer-readable medium and executed by the processor, operative to manage translation tasks,
　　wherein the processor is programmed to:
　　　　retrieve token names from the database component;
　　　　identify token names written into the software application;
　　　　calculate, based on comparison of the retrieved token names with the identified token names, at least one token name written in the software application and not retrieved from the database component, wherein the token names are unique within the software application and are configured to be reused;
　　　　generate a record in the database corresponding to the calculated token name that was not retrieved from the database component;
　　　　notify a developer of the software application to provide a native language message corresponding to the calculated token name;
　　　　receive, from the developer, the native language message corresponding to the calculated token name;
　　　　identify the existence of a translation tool; and
　　　　if the translation tool comprises an application programming interface (API), then:
　　　　　　transmit, via the API, the native language message to the translation tool for translation; and
　　　　　　receive, via the API, a translated native language message;
　　　　otherwise:
　　　　　　receive a translated native language message from a human translator; and
　　　　update the database record with the translated native language message.

5. A non-transitory computer-readable medium comprising computer executable instructions executed by a processor, operative for use in managing tasks associated with translation for a software application, the computer executable instructions comprising:
　　identifying a token name included in the software application but not included in a database for storage of token names accessible by the software application, wherein the identifying comprises comparing the token name to the database contents, wherein the token names are unique within the software application and are configured to be reused;
　　notifying a developer of the software application to provide a native language message corresponding to the identified token name;
　　receiving from the developer the native language message corresponding to the identified token name;
　　applying to the received native language message a set of rules to calculate whether the received native language message is not included in the database;
　　generating a record in the database corresponding to the identified token name and to the received native language message that was calculated as not being included in the database;
　　identifying the existence of a translation tool; and
　　if the translation tool comprises an application programming interface (API), then:
　　　　transmitting, via the API, to the translation tool the unincluded native language message; and
　　　　receiving, via the API, a translated native language message;
　　otherwise:
　　　　receiving a translated native language message from a human translator; and
　　　　updating the database record with the translated native language message.

\* \* \* \* \*